United States Patent
Chan et al.

(10) Patent No.: US 10,809,376 B2
(45) Date of Patent: Oct. 20, 2020

(54) SYSTEMS AND METHODS FOR DETECTING OBJECTS IN UNDERWATER ENVIRONMENTS

(71) Applicants: Michael T. Chan, Bedford, MA (US); Daniel J. Scarafoni, Cambridge, MA (US); Alexander C. Bockman, Brookline, MA (US)

(72) Inventors: Michael T. Chan, Bedford, MA (US); Daniel J. Scarafoni, Cambridge, MA (US); Alexander C. Bockman, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 353 days.

(21) Appl. No.: 15/864,912

(22) Filed: Jan. 8, 2018

(65) Prior Publication Data
US 2019/0033447 A1 Jan. 31, 2019

Related U.S. Application Data

(60) Provisional application No. 62/443,085, filed on Jan. 6, 2017.

(51) Int. Cl.
| | | |
|---|---|---|
| G01S 15/89 | (2006.01) | |
| G01S 7/56 | (2006.01) | |
| G06K 9/62 | (2006.01) | |
| G06K 9/20 | (2006.01) | |
| G01S 7/539 | (2006.01) | |
| G06K 9/46 | (2006.01) | |

(52) U.S. Cl.
CPC .............. *G01S 15/89* (2013.01); *G01S 7/539* (2013.01); *G01S 7/56* (2013.01); *G06K 9/2018* (2013.01);
(Continued)

(58) Field of Classification Search
CPC ............ G01S 15/89; G01S 7/539; G01S 7/56; G06K 9/4628; G06K 9/2018;
(Continued)

(56) References Cited

U.S. PATENT DOCUMENTS

| | | | | |
|---|---|---|---|---|
| 5,822,272 A | * | 10/1998 | Ream, Jr. ............... | G01V 15/00 367/2 |
| 2009/0232406 A1 | * | 9/2009 | Saisan ..................... | G01S 15/88 382/224 |

(Continued)

OTHER PUBLICATIONS

Barngrover, Christopher, et al. "A Brain-Computer Interface (BCI) for the Detection of Mine-Like Objects in Sidescan Sonar Imagery." IEEE Journal of Oceanic Engineering 41.1 (Jan. 2016): 123-138.
(Continued)

*Primary Examiner* — Daniel Pihulic
(74) *Attorney, Agent, or Firm* — McCarter & English, LLP; David R. Burns

(57) ABSTRACT

Surveillance systems and methods taught herein provide automated detection and classification of objects of interest in a submerged or underwater environment such as a body of water. The sonar systems and methods taught herein can detect and classify a variety of objects in echograms without feedback or instructions from a human operator. The sonar systems and methods taught herein include a data model that is partially trained using non-echogram image data and can associate geolocation information with detected objects of interest.

40 Claims, 13 Drawing Sheets

(52) U.S. Cl.
CPC ......... *G06K 9/4628* (2013.01); *G06K 9/6256* (2013.01); *G06K 9/6271* (2013.01); *G06K 9/6282* (2013.01); *G06K 2209/21* (2013.01)

(58) Field of Classification Search
CPC .. G06K 9/6271; G06K 9/6282; G06K 9/6256; G06K 2209/21
See application file for complete search history.

(56) References Cited

U.S. PATENT DOCUMENTS

2018/0356509 A1* 12/2018 Haghighi ................. G01S 7/41
2019/0033447 A1* 1/2019 Chan ....................... G01S 15/89

OTHER PUBLICATIONS

Girschick, Ross. "Fast R-CNN." Proceedings of the 2015 IEEE International Conference on Computer Vision (ICCV). IEEE Computer Society, Dec. 2015, p. 1440-1448.

Jijlings, Jasper RR, et al. "Selective search for object recognition." International journal of computer vision 104.2 (Sep. 2013): 154-171.

Cai et al., A Fast Sonar-based Benthic Object Recognition Model via Extreme Learning Machine. IEEE Washington Ocean's '15 MTS. Oct. 19-22, 2015. 4 pages.

He et al., A Configurable SIMD Architecture with Explicit Datapath for Intelligent Learning. 2016 International Conference on Embedded Computer Systems: Architectures, Modeling and Simulation (SAMOS). Jul. 17-21, 2016. 8 pages.

Pyo et al., Acoustic beam-based man-made underwater landmark detection method for multi-beam sonar. 2017 IEEE Underwater Technology (UT). Feb. 21-24, 2017. 5 pages.

Teixeira et al., Robust particle filter formulations with application to terrain-aided navigation. International Journal of Adaptive Control and Signal Processing. 2017;31:608-651. Published online Jun. 9, 2016.

Zhu et al., Soft Proposal Networks for Weakly Supervised Object Localization. eprint arXiv:1709.01829, Cornell University. Sep. 6, 2017. 4 pages.

* cited by examiner

FIG. 4B Detail
FIG. 4C Detection Chip
Classification: Black Box
Score: 0.323

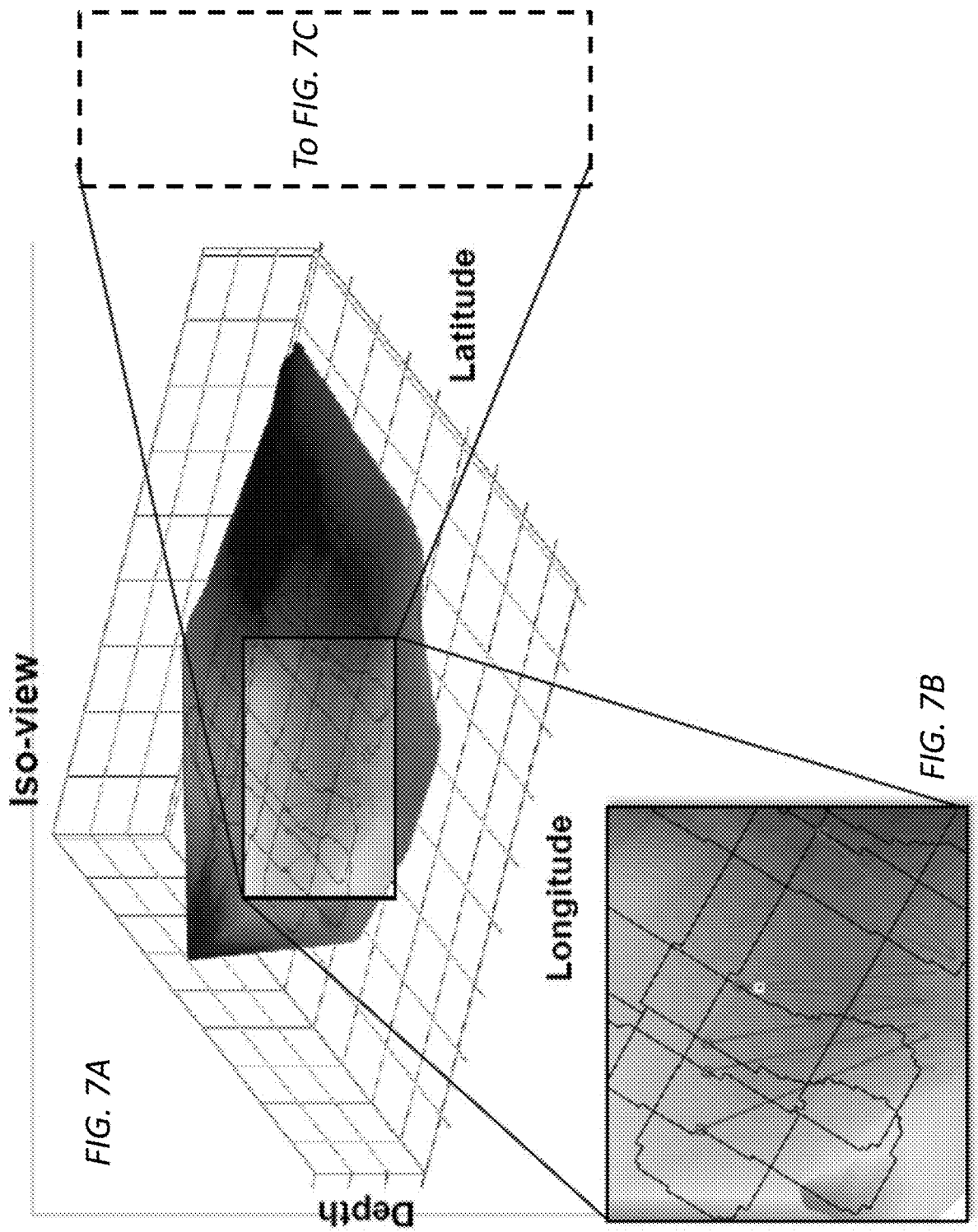

SYSTEMS AND METHODS FOR DETECTING OBJECTS IN UNDERWATER ENVIRONMENTS

RELATED APPLICATIONS

This application claims priority to U.S. Provisional Application No. 62/443,085, filed Jan. 6, 2017, the entire contents of that application being incorporated herein by reference.

STATEMENT OF GOVERNMENT SUPPORT

This invention was made with Government support under Contract No. FA8721-05-C-0002 awarded by the U.S. Air Force. The Government has certain rights in the invention.

BACKGROUND

Detection of objects underwater is an important goal in many security and recovery applications. However, underwater detection is a challenging problem as common electro-optical imaging methods work poorly underwater. Interpretation of images obtained using echogram techniques (such as sonar or ultrasound images) requires trained and experienced personnel. Even with training, it can be difficult to distinguish objects of interest from background in an echogram.

SUMMARY

In exemplary embodiments taught herein, a method of detecting and classifying an object of interest underwater in a sonar system is provided. The method includes acquiring an echogram of a scene. The method includes transferring a portion of the echogram to a deep neural network including one or more feature extraction layers and one or more classification layers. The method includes processing, using the deep neural network, the portion of the echogram to detect an object of interest captured in the echogram.

A system for detecting and classifying an object underwater is provided. The system includes a computing device including a processor and a memory operatively coupled to the processor. The memory has stored therein instructions that when executed by the processor cause the processor to acquire an echogram of a scene. The instructions further cause the processor to transfer a portion of the echogram to a deep neural network including one or more feature extraction layers and one or more classification layers. The instructions further cause the processor to process, using the deep neural network, the portion of the echogram to detect an object of interest captured in the echogram.

BRIEF DESCRIPTION OF DRAWINGS

The accompanying drawings, which are incorporated in and constitute a part of this specification, illustrate one or more embodiments of the invention and, together with the description, help to explain the invention. The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIGS. 4A-4C illustrate results from use of the sonar system according to embodiments taught herein to detect and classify an object of interest underwater.

FIGS. 7A-7E illustrate a variety of views of detection trajectories and predicted latitude and longitude for objects of interest detected underwater according to various embodiments taught herein.

DETAILED DESCRIPTION

Figure 1A:
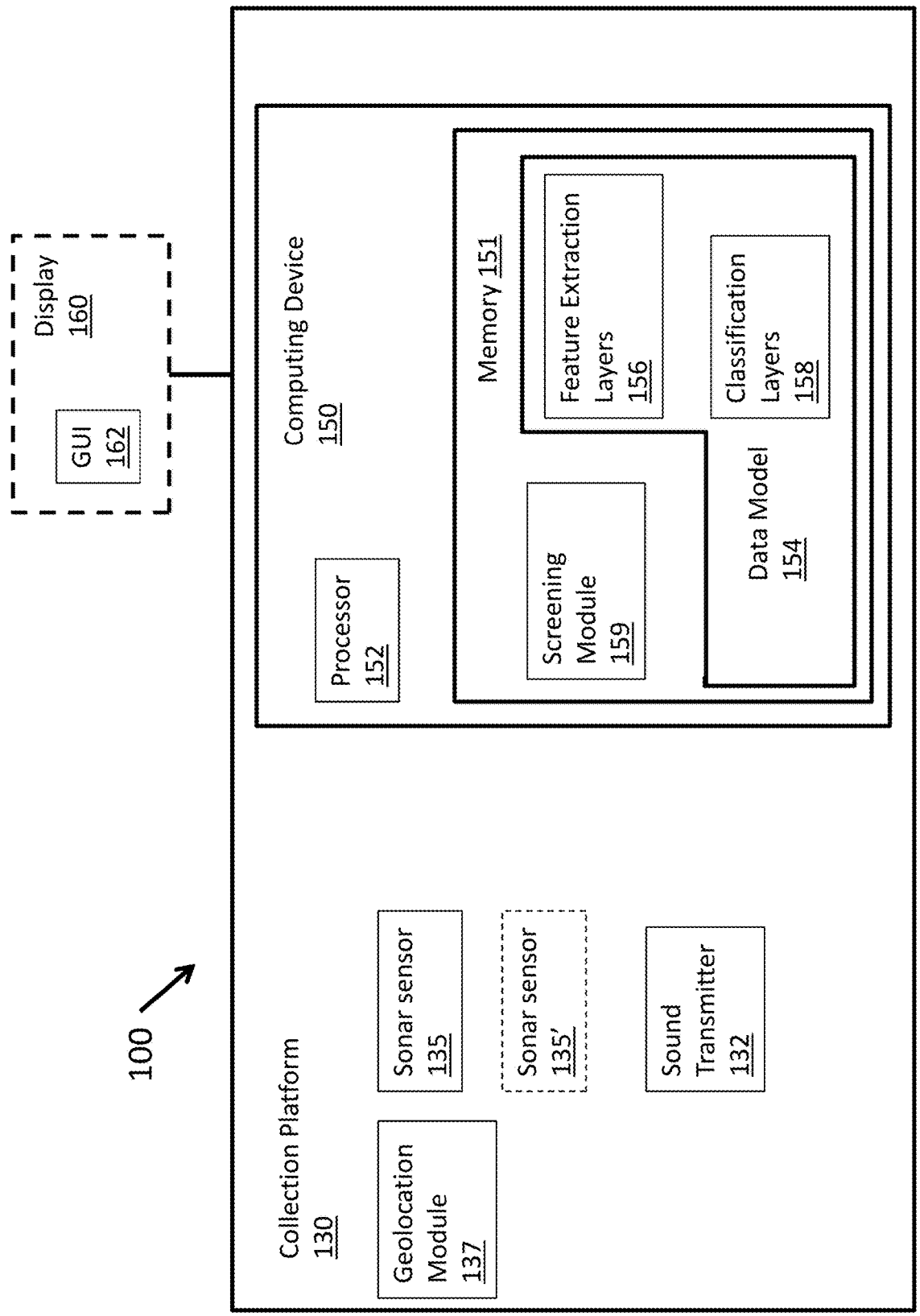
FIGS. 1A and 1B illustrate sonar systems for detecting and classifying an object of interest underwater in accordance with various embodiments taught herein.

Systems and methods taught herein provide automated detection and classification of objects of interest in a submerged or underwater environment such as a body of water. The systems and methods taught herein may detect and classify objects of interest in real-time without feedback or instructions from a human operator. In one embodiment, systems and methods taught herein can accurately detect and classify objects of interest in echograms using a data model that is partially trained using non-echogram image data, for example, images obtained with optical imaging devices or images obtained with an electro-optical imaging device. Systems and methods taught herein can associate geolocation information with detected objects of interest using information about the geolocation and pointing vector of the sensor and interpolated bathymetry of the floor of the body of water. In some embodiments, the systems and methods taught herein include a graphical user interface (GUI) or other decision support tools to allow a user to quickly review automated detection results and geolocation results for detected objects.

Conventionally, interpretation of sonar imagery requires an experienced human operator. Experience is needed to interpret images created from sound waves as they typically bear little resemblance to images generated using light waves (i.e., electro-optical images). For example, sonar imagery is often plotted as range vs. time rather than familiar two-dimensional (x-y) images created with light waves.

Embodiments taught herein can use a data model learned from training data to detect and classify objects in images created using sound waves. In some embodiments, the data model can classify a detected object based upon whether the object is hollow or solid and whether the object is natural or man-made.

The number of available annotated echograms suitable for training a data model is limited relative to the number of available annotated non-echogram images (e.g., electro-optical images), which is orders of magnitude greater. In embodiments taught herein, the data model can include feature extraction layers that are trained using non-sonar image data and classification layers trained using sonar image data. Training the feature extraction layers using a vast corpus of existing non-sonar image data improves the robustness of the feature extraction layers at discriminating and extracting relevant features. Training the final classification layers using sonar image data improves robustness in detection and classification of objects specific to sonar imagery. Although sonar image data and non-sonar image data (such as electro-optical image data) are highly dissimilar, the data model trained using both types of images is surprisingly and unexpectedly robust at identifying and classifying objects of interest in sonar images.

As used herein, "autonomous" refers to a system or module that is self-directing or self-determining without intervention from external persons or systems. For example, autonomous systems and methods taught herein can perform one or more of image analysis, object detection, and object classification without input from an independent operator.

As used herein, a "vehicle" is a conveyance or device for transporting substances, objects, or individuals and is not limited to motorized objects. In various embodiments, a vehicle can be a car, truck, airplane, boat, ship, canoe, sailboat, submarine, or any other conveyance or vessel.

As used herein, a "feature" extracted from an image or video frame is an informative characteristic. Features can be tracked or followed from frame to frame to identify points or objects within a video. A feature can generally be a distinctive part of an image marked by its 2D point location and an associated multi-dimensional feature descriptor vector calculated from its surrounding pixels.

As used herein, an "echogram" is an image formed using sound wave imaging techniques. Echograms can include information obtained using low frequency sound waves such as sonar images or high frequency sound waves such as ultrasound imagery. Information in an echogram can include intensity or time of flight of reflected sound waves as a function of distance or depth, for example.

As used herein, an "electro-optical" image is an image formed using visible light waves. Often, the visible light waves are imaged using a digital light acquisition system such as a camera including a charge coupled device (CCD). Information in an electro-optical image can include light intensity or color value (e.g., hue) at each pixel, for example.

FIG. 1A illustrates a sonar system 100 for detecting and classifying an object of interest underwater in accordance with various embodiments taught herein. In various embodiments, the sonar system 100 includes a collection platform 130 that can communicate with a display 160. The collection platform 130 can include a geolocation module 137, one or more sonar sensors 135 to form a sonar array, and a sound transmitter 132. The collection platform 130 can also include a computing device 150 having a processor 152 and a memory 151. The memory 151 can hold a screening module 159 and a data model 154 that can include one or more feature extraction layers 156 and one or more classification layers 158. As described in greater detail below, the data model 154 can perform a layered analysis of images derived from sound waves (e.g., echograms such as sonar images or ultrasound images) obtained by the collection platform 130 to detect and classify objects of interest appearing in the echograms.

Although the systems described herein are referred to as "sonar" systems, it is contemplated that the imaging and image analysis techniques described herein are applicable to systems beyond sonar systems and applications such as open water detection, for example. In particular, any system that performs imaging with sound waves including ultrasound systems can be compatible with the methods and techniques taught herein.

The sonar system 100 can perform autonomous or programmatic analysis of echograms to detect and classify objects of interest in challenging environments such as underwater where there may be many unexpected variations in the sea floor and the echogram images are rarely "clean." For example, echograms can inherently include "ringing" due to multiple sound reflections within an object that can obscure the true extent or nature of an object. In addition, the object of interest can exhibit a two-dimensional image signature with a spatial extent that is larger than what the object's true physical size would suggest. The sonar system 100 can surprisingly and robustly detect objects of interest in echograms in spite of these difficulties as described below. In some embodiments, the sonar system 100 can acquire and analyze echogram images locally in real-time to allow users to provide immediate feedback and course correction. By providing real-time detection and classification, a user can identify the object of interest and immediately dispatch a retrieval crew without needing to make separate trips onto the water.

In an exemplary embodiment, the collection platform 130 can be portable or mounted to a boat or other water-navigable vessel or vehicle. The collection platform 130 can be controlled by a local operator or can be remotely controlled from a distant location such as a shore near a body of water or a different vehicle on the body of water. In some embodiments, the vessel to which the collection platform 130 is mounted can navigate autonomously to follow a pre-determined route or can navigate in response to detection of the underwater object of interest. For example, the vessel to which the collection platform 130 is mounted may navigate to pass over a suspected or detected location of the object of interest from a different angle. In various embodiments, the collection platform 130 can be located on a surface vehicle or on a submersible.

The collection platform 130 can include one or more sound transmitters 132. In some embodiments, the sound transmitters 132 can be mounted directly to the collection platform 130 or can be suspended in the water near the collection platform 130. The sound transmitters 132 emit sound waves into the water that are reflected from objects in a scene in the water and return to the collection platform 130 via the sonar sensor 135. In some embodiments, the extent of the emission cone of the sound waves can determine the extent of the scene that is visualized. In some embodiments, the sound transmitters 132 can emit sound waves at more than one frequency. In various embodiments, emission of sound waves at more than one frequency can occur sequentially or simultaneously. By emitting sound waves at different frequencies (e.g., hyperspectral imaging), the sound transmitters 132 can probe objects at a range of different sizes or objects having features at different size scales. For example, the object may have detail at a small length scale (such as changes in material properties or shape) and other details at a large length scale (such as the overall size of the object and long, straight edges). Sound waves at different frequencies interact differently with features at different scales. Thus, use of different frequencies to probe objects of interest can provide additional complementary information that a single frequency alone cannot obtain.

The collection platform 130 can include the one or more sonar sensors 135, 135' in some embodiments. The sonar sensor 135 can be a hydrophone, microphone, or any other suitable variety of transducer that can convert sound waves to a measurable analog or digital signal. In some embodiments, the sonar sensor 135 can measure one or more of signal strength and time-of-arrival of sound waves. The sonar sensor 135 can be mounted to a vehicle or can be suspended in the water near the vehicle. In various embodiments, the sonar sensor 135 can operate in an active or passive mode. In the passive mode, the sonar sensor 135 detects sound waves generated by the object itself or sound waves originating from a third party and reflected from the object. In the active mode, sonar sensors 135 detect sound waves emitted by the sound transmitters 132 and reflected from the object. The detected sound waves can be transformed into an echogram by the computing device 150 in some embodiments. An exemplary echogram can include range information along a first axis and time information along a second axis. In some embodiments, the time information can correspond to acquisition time as the collection platform 130 moves at a given heading through the water.

In some embodiments, the sound transmitter 132 and the sonar sensor 135 can both be implemented with a single instrument operated in different modes. For example, a single hydrophone can be used to emit sound waves as the sound transmitter 132 and then receive the reflected waves as the sonar sensor 135. In some embodiments, the sound sensor 135 can be a side-scan sonar sensor. In some embodiments, the sound transmitter 132 and the sonar sensor 135 can operate at ultrasonic frequencies.

In some embodiments, the collection platform 130 can acquire a first echogram of a scene or region underwater and can acquire a second echogram of the same scene or region underwater. The second echogram can be acquired at a different frequency than the first echogram in some embodiments. In some embodiments, the second echogram can include a different pose or view angle for objects of interest in the scene than the first echogram.

Figure 1B:
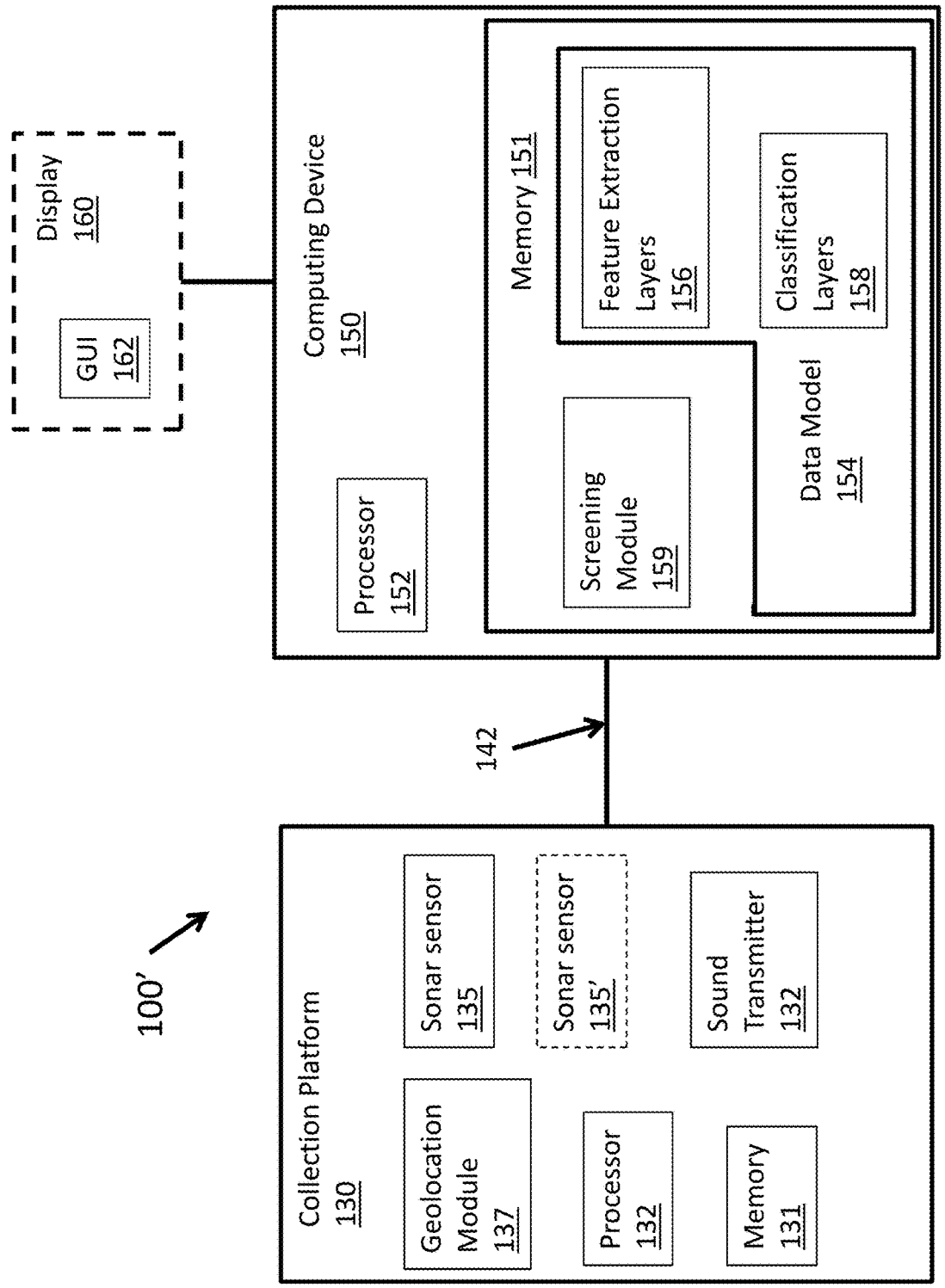

FIG. 1B illustrates an alternative embodiment of a sonar system 100' for detecting and classifying an object of interest underwater in accordance with various embodiments taught herein. The sonar system 100' includes the collection platform 130 in communication with the distinct computing device 150 via a communication link 142. The communication link 142 can be wired, wireless, or a combination of wired and wireless. The computing device can connect to a display 160. In contrast to the sonar system 100 of FIG. 1A, the collection platform 130 can handle acquisition and, in some cases, generation of the echogram image while the geographically separated computing device 150 handles object detection and classification. This arrangement allows for even greater flexibility in form for the collection platform 130. For example, the collection platform 130 can be mounted to a lightweight, unmanned autonomous vessel and can send echogram information to the computing device 150 located on shore for analysis. In addition to the geolocation module 137, the one or more sonar sensors 135, and the sound transmitter 132, the collection platform 130 of sonar system 100' can include a processor 132 and a memory 131. The memory 131 can include instructions to be executed by the processor 132 to direct the collection platform 130 to acquire echogram images. For example, the memory 131 can include instructions to activate the sound transmitter 132 and receive data using the sonar sensors 135, 135'. In some embodiments, the memory 131 can include instructions to be executed by the processor 132 to control navigation or movement of the vessel to which the collection platform 130 is attached. In some embodiments, the memory 131 can include instructions to be executed by the processor 132 to communicate via the communications link 142 with the computing device 150.

The modules and layers making up the data model 154 can be executed as a single executable unit in some embodiments. Alternatively, each module can be separately executable as a distinct module. Although depicted as separate units in FIG. 1, layers from among the feature extraction layers 156 can be re-classified as classification layers 158 in some embodiments and layers from among the classification layers 158 can be re-classified as feature extraction layers 156 in some embodiments. In exemplary embodiments, one or more of the modules taught herein can be executed on the computing device 150. Additional details of the exemplary computing device 150 are discussed below in relation to FIG. 9. In some embodiments, modules can be distributed in a distributed computing environment as discussed below in relation to FIG. 10. The data model 154 may be resident in the memory 151 of the computing device 150 or may be loaded from a storage device such as a local or networked memory or a hard drive (not shown).

Use of the data model 154 to automatedly detect and classify objects of interest involves using a layered algorithmic approach. In some embodiments, initial generation and training of the data model 154 can be based on machine learning methods such as deep neural networks (DNN), which can include convolutional neural networks (CNN), autoencoders, deep believe networks (DBN), or recurrent neural networks (RNN). In machine learning, a deep neural network is a type of feed-forward artificial neural network in which the connectivity pattern among neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. In an example implementation, portions of the data model 154 can include one or more DNN architectures such as AlexNet, ResNet, VGG-Net, GoogLeNet, or other variants based on Google Inception.

Figure 2:
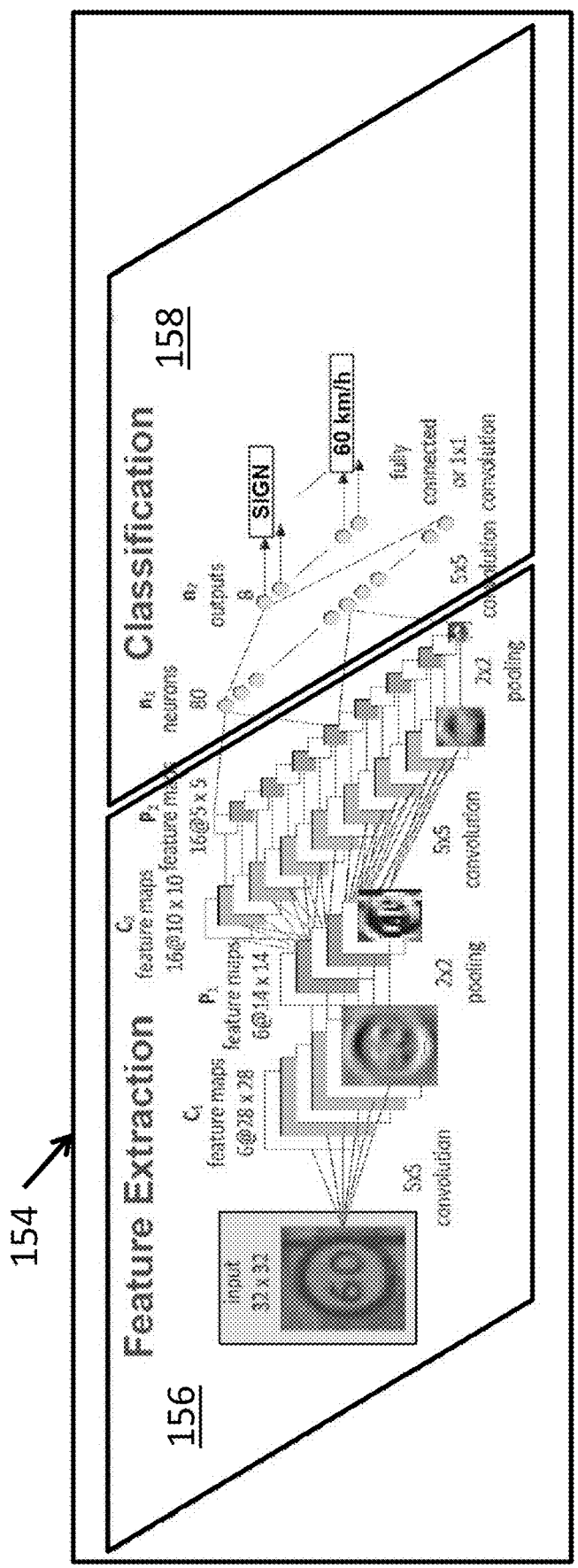
FIG. 2 illustrates the layered organization of an exemplary data model in accordance with various embodiments taught herein.

Details of the data model 154 are illustrated in FIG. 2. The layers in this detection and classification approach can include feature extraction layers 156 and classification layers 158. In some embodiments, the data model 154 can comprise up to 5, up to 10, up to 30, or even higher numbers of stacked layers of artificial "neurons." Each image is fed into the input layer, which then communicates to the next layer, until eventually the "output" layer is reached. The data model's "answer" or analysis is provided by this final output layer. In practice, each layer of the data model 154 progressively extracts higher-level features of the image until the final layer determines what the image shows. For example, the first or lowest layer may identify edges or corners. Intermediate layers may interpret basic features to look for overall shapes or components like a door or a leaf. The final few layers assemble those into complete interpretations.

In various embodiments, layers of the data model 154 can include convolution, pooling, rectified linear units (ReLU), dropout, or network-in-network layers. The operations performed by the layers can include linear or non-linear operations in some embodiments. Each layer operates on an input (beginning, for example, with the echogram) and produces an output (referred to as a feature map or activation map). Subsequent layers in the model take feature maps from previous layers as input and output new feature maps to be operated on by subsequent layers.

Layers in the data model 154 can be partially-connected or fully-connected. When two layers are fully-connected, each neuron in the input activation map or layer is connected to every neuron in the output activation map or layer. Conversely, two layers that are partially-connected indicates that each neuron in the input layer is only connected to a subset of neurons in the output layer.

In accordance with various embodiments, the data model 154 can be trained and executed on a variety of suitable frameworks or platforms. In some embodiments, the data model 154 can be implemented on a Caffe, TensorFlow, Torch, or Theano framework. The framework can operate the data model 154 in a backward direction in a training phase and in a forward direction in an implementation or execution phase.

In an exemplary embodiment, the data model 154 receives an echogram 105 as an input into the data model 154. The data model 154 can be used to process the echogram 105 to detect and classify objects of interest in the echogram 105. As described in greater detail below, processing of the echogram using the data model 154 can produce as outputs a bounding box on the echogram image indicating the extent of the object of interest in the image and a proposed classification for the object of interest.

In some machine learning methods, the layers of the data model 154 are trained using annotated images of a type similar to the expected images that the data model will be used to assess. For example, a data model that is to be used to detect and classify an object such as "cats" in standard electro-optical (EO) images is trained using electro-optical images that have been annotated by a human who has verified that the image includes cats. As is known in the field of machine learning, training the data model with a greater number and variety of annotated images can produce a more robust and discriminatory model with higher accuracy rates. Thus, the dearth of annotated echogram data presents an impediment to training the data model 154 using strictly echogram images because the data model 154 includes a large number of parameters. In some embodiments, the feature extraction layers 156 can be trained and optimized to conduct many-category image classification using E/O imagery, a domain where millions of annotated images exist today. By using feature extraction layers 156 trained with a large set of annotated E/O images, a large subset of the parameters that the data model needs to learn for successful detection and classification are satisfied using the large E/O dataset. Thus, the remaining parameters that must be learned and tuned to specifically detect objects in echogram images can be satisfied using the smaller number of annotated echogram images available.

In accordance with various embodiments, the classification layers 158 of the data model 154 can be trained using echogram images. In some embodiments, the classification layers 158 can include fully-connected layers. By training the classification layers 158 of the data model 154 using echogram images, the data model 154 can learn a smaller set of parameters specific to echograms. Thus, the classification layers 158 can be effectively trained using a smaller set of annotated echogram image data than would be needed to train all layers of the data model 154. In some embodiments, the classification layers 158 can be effectively trained using between 50 and 300 annotated echogram image samples depending on the fidelity desired. In some embodiments, the classification layers 158 can be trained using fewer than 500 annotated echogram image samples. In an exemplary embodiment, the classification layers 158 can be effectively trained using 100 raw annotated echogram images. In some embodiments, data augmentation techniques such as flipping, rotating, shifting, translating, cropping, and adding noise can be used to extend and supplement the number of effective annotated echogram images that can be used for training.

In some embodiments, the feature extraction layers 156 can include partially-connected layers and the classification layers 158 can include fully-connected layers. In other embodiments, the feature extraction layers 156 and the classification layers 158 can include partially-connected layers, fully-connected layers, or both. In an exemplary embodiment, all layers of the data model 154 can be initially trained using E/O images. This provides baseline values for the parameters and associated weights for each classification. Then, the parameters and weights for neurons in the feature extraction layers 156 can be frozen and the classification layers 158 can be re-trained using annotated echogram images in a form of transfer learning. During re-training, the fully-connected classification layers are allowed to vary to adapt to different cues or features that are found in the echogram images with respect to E/O images. In some embodiments, the highest level feature extraction layers 156 can become classification layers 158 and can be re-trained in the process described. Re-training layers deeper into the data model 154 can provide better classification, discrimination, and detection results but should be supported by a larger number of annotated images to ensure successful re-training.

In some embodiments, the output of the classification layers 158 can include a binary distinction for a possible detection region in the echogram such as between categories of "object of interest" or "background." In other embodiments, the output of the classification layers 158 can include a distinction from among a large number of classes. In some embodiments, the classification layers 158 can classify an object of interest as to whether it is likely to contain organic or inorganic components or as to whether the object of interest is solid or fluid-filled (e.g., a hollow shell).

In some embodiments, the memory 151 can include a screening module 159. The screening module 159 can screen the echogram image to identify one or more candidate regions of interest. In some embodiments contemplated herein, operations implemented by the screening module 159 are less computationally intensive than operations implemented by the data model 154. Thus, the screening module 159 can act as an effective pre-screen to nominate or propose areas that will be subjected to a complete analysis using the layers of the data model 154. The pre-screen process implemented by the screening module 159 can reduce total computational overhead relative to use of the data model 154 alone. In some embodiments, the screening module 159 can segment the image using selective search. In some embodiments, the selective search employed by the screening module 159 can include selective search techniques described in "Selective search for object recognition"

by Jasper Uijlings et al. published in International journal of computer vision 104.2 (September 2013): 154-171, the entire contents of which is incorporated herein by reference in its entirety. In some embodiments, the screening module 159 can analyze the echogram to assess groups of neighboring pixels to identify groups that are similar in some way. For example, neighboring pixels in a group can have similar intensities or other low-level properties that are uncommon in background data in echograms such as certain textures or patterns in the image or certain patterns of response at certain frequencies. In some embodiments, the output of the screening module 159 can include region of interest bounding boxes that indicate groups of pixels to be processed by the data model 154.

In some embodiments, the screening module 159 can use selective search in the first step to over-segment the echogram based on pixel intensity. In this context, oversegmentation is the process by which objects being segmented in the echogram are themselves segmented into subcomponents. Then, the screening module 159 can add bounding boxes for all proposed regions of interest based upon the results of oversegmentation. Next, the screening module 159 can hierarchically group adjacent segmented regions based upon similarity. For example, similarity scores for all neighboring segmented regions can be calculated, and the two neighbors with the highest similarity can be grouped. This process can repeat iteratively with the grouped regions. The screening module 159 can repeat these steps while modifying the controlling parameters until convergence is achieved. In some embodiments, the regions of interest that remain can be processed by the data model 154.

In some embodiments, the selective search implemented by the screening module 159 can be cued on signal-to-noise ratio (SNR). For certain objects of interest, the reflection of the sound wave signal is undistorted and un-attenuated relative to reflections from background elements or clutter in the scene. The match between the transmitted and received signals can result in a large SNR for the object of interest relative to background or clutter. Thus, regions of high SNR can indicate the presence of an object that is worth assessing using the more computationally intensive data model 154. In some embodiments, the screening module 159 can assess SNR in the echogram to identify regions of interest. In some embodiments, the screening module 159 can perform a search using SNR as a detection metric.

Figure 3:
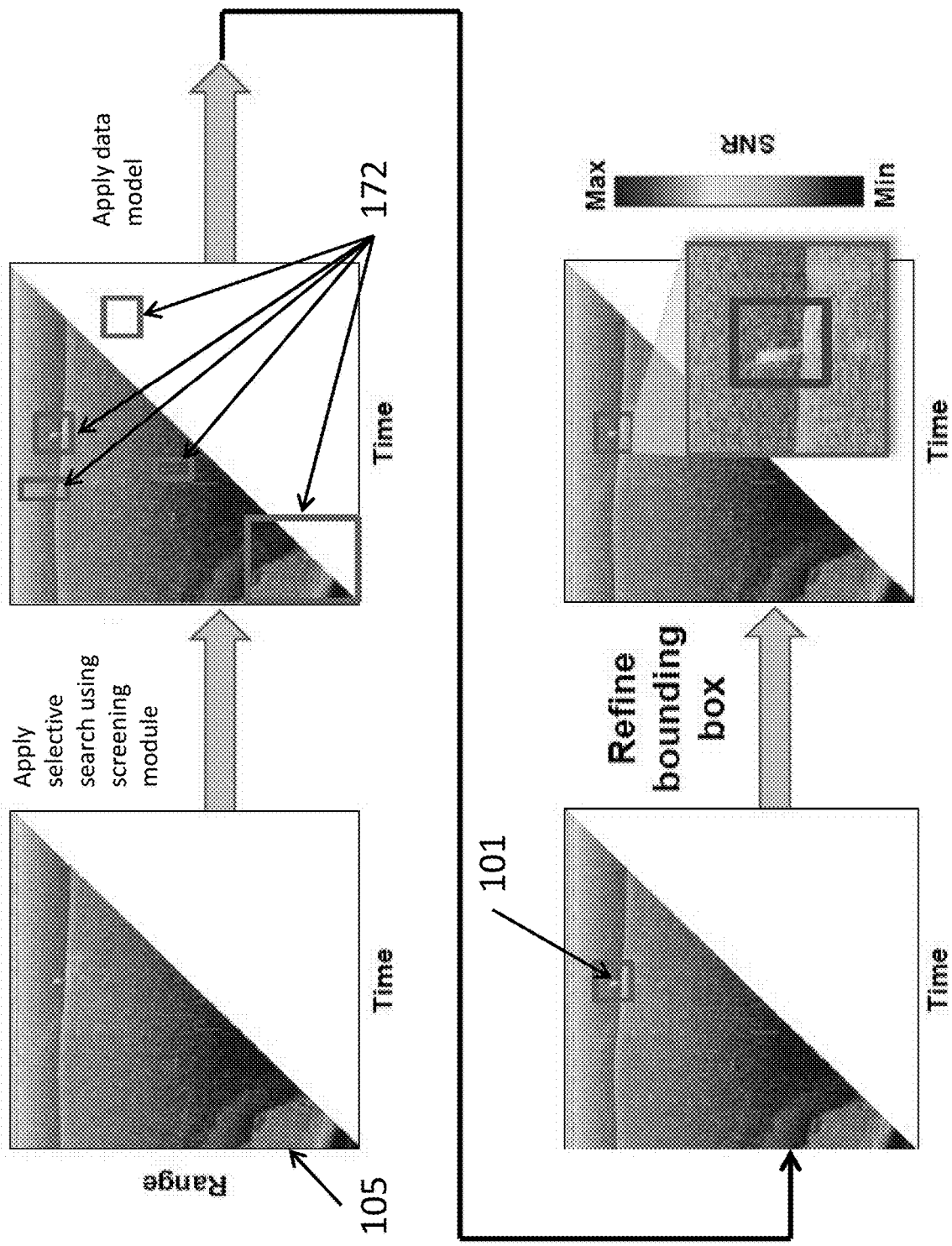
FIG. 3 illustrates a workflow for detecting and classifying objects of interest in echogram images in accordance with embodiments taught herein.

FIG. 3 illustrates a workflow for detecting and classifying objects of interest in echogram images in accordance with embodiments taught herein. In a first stage, the selective search is applied via the screening module 159 to identify potential regions of interest 172. In some embodiments, potential regions of interest 172 can be defined by a bounding box that represents the bounds of the region of interest 172. Potential regions of interest can also be referred to as detection chips in some sources. In the example shown in FIG. 3, the screening module 159 identified five potential regions of interest that could represent objects of interest. In the second stage, the data model 154 is applied to analyze the potential regions of interest 172 to detect objects of interest in those regions. In this example, an object of interest 101 was detected in just one of the potential regions of interest 172. In some embodiments, the workflow can conclude with refinement of the bounding box surrounding the object of interest 101. In some embodiments, detection and classification of objects of interest begins with the second stage and does not rely on the first stage including the screening module.

In some embodiments, an object bounding box can be generated to include all portions of the object in the image as determined by the data model 154 by starting from the bounding box defining the bounds of the region of interest. In some embodiments, the refined object bounding box can include fewer or greater pixels than the number of pixels in the initial region bounding box. That is, the refinement process can grow or shrink the bounding box to more closely approximate the extent of the object of interest 101 in the echogram image.

In a particular validation test, the top scoring bounding box in nearly all test images included the object-of-interest, i.e., the systems and methods described herein can achieve a very high recall rate.

Figure 4A:
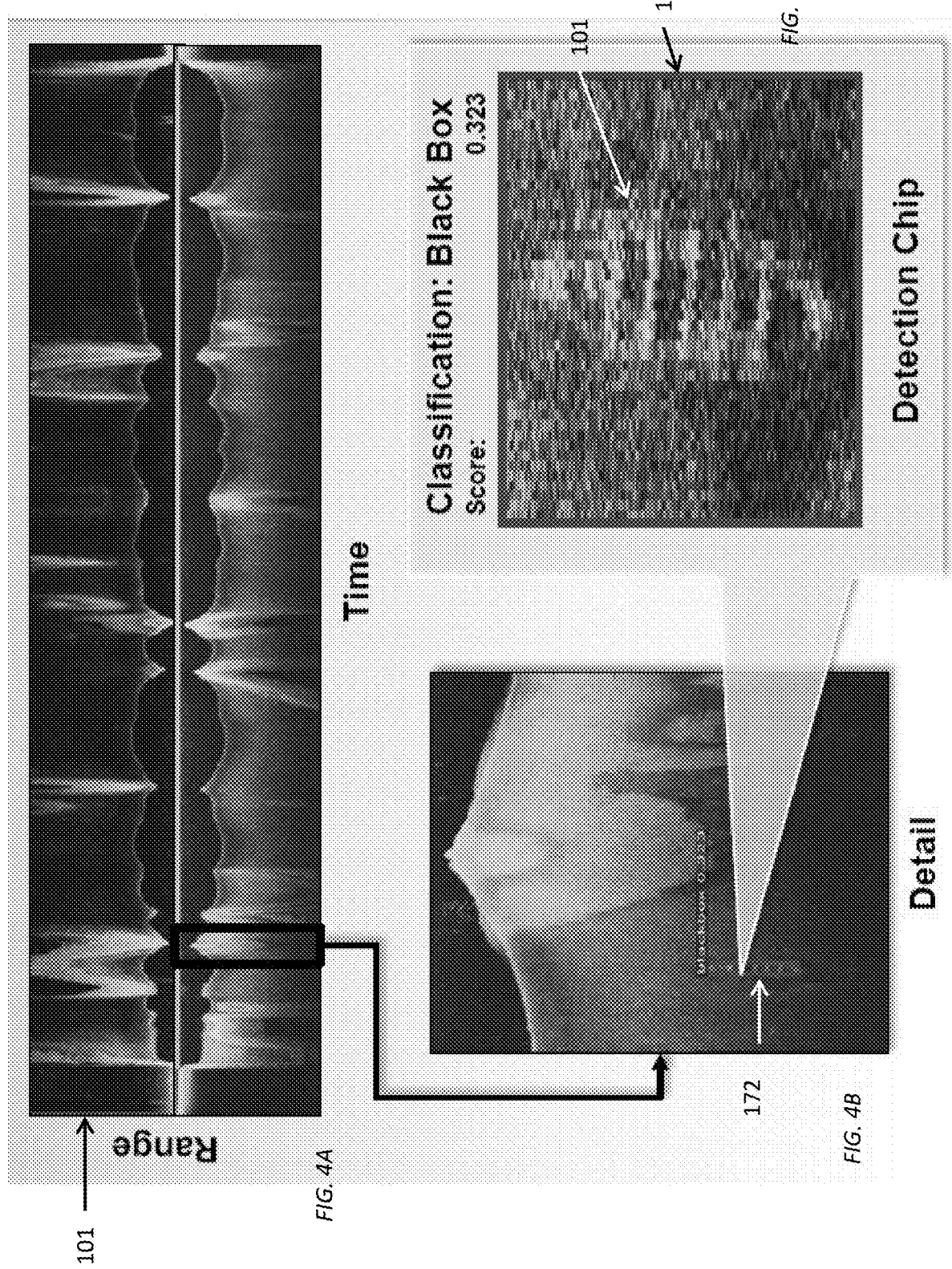

FIGS. 4A-C illustrates an exemplary detection and classification of an object of interest in the echogram image 101 that was acquired and analyzed in accordance with embodiments taught herein. The inset images in FIGS. 4B and 4C show magnified portions of the echogram image. In this test, a mockup of a "black box" airplane flight data recorder was submerged and imaged using the collection platform 130 as described above. In some embodiments, systems and methods of the present disclosure can distinguish interactions of active acoustics signals with solid, natural objects and with man-made objects. In particular, many man-made objects can be characterized as being thin-shelled, hollow, and filled with the surrounding fluid or otherwise inhomogeneous in composition. These hollow objects can have a distinctive echogram image signature in some embodiments. The energy of a particular beam of sound waves can be reflected back multiple times as slightly different time intervals due to multi-path effects within the object itself. As described above, the object of interest can also exhibit a two-dimensional image signature with a spatial extent that can be larger than what the object's true physical size would suggest.

As shown in the image of the region of interest 172 or detection chip illustrated in FIG. 4C, the data model 154 has classified the object of interest 101 in the image as a "black box." In accordance with various embodiments, the data model 154 can provide a user with scores associated with each proposed classification. The scores can correspond to a confidence level that the detected object of interest belongs to the proposed classification. As described above, this "hollow" object exhibits a noticeable ringing effect manifesting as bands or stripes. In some embodiments, the differences in how sound waves interact with different objects (e.g., solid versus hollow or natural versus man-made) can be exploited by the data model 154 to improve classification predictions.

Figure 5:
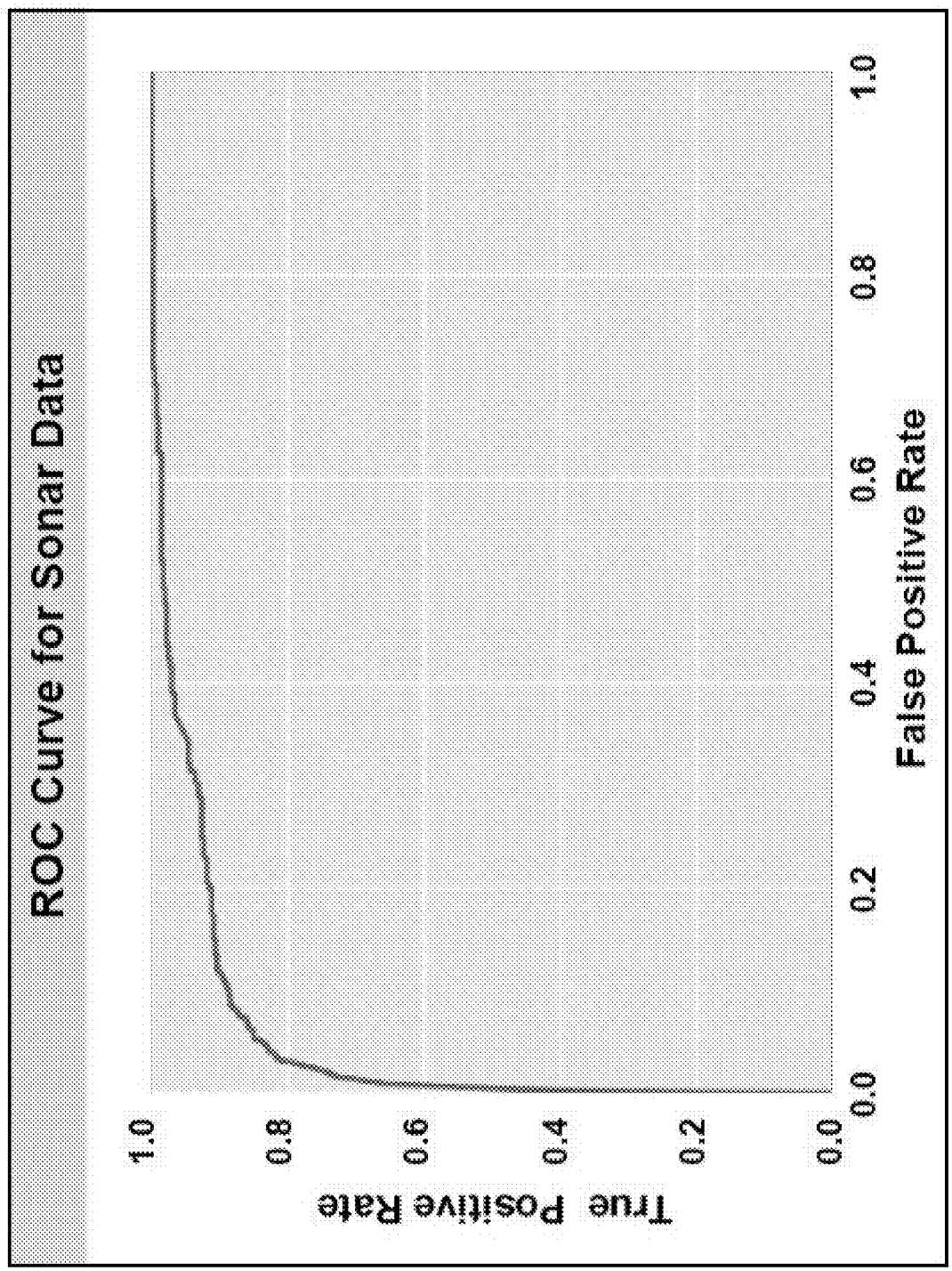
FIG. 5 illustrates a receiver operating characteristic curve determined for embodiments of the present disclosure employed in the field.

FIG. 5 illustrates a receiver operating characteristic curve determined for embodiments of the present disclosure employed in the field. As shown in the figure, embodiments of systems taught herein exhibit impressive rates of true-positive to false-positive detections.

Figure 6:
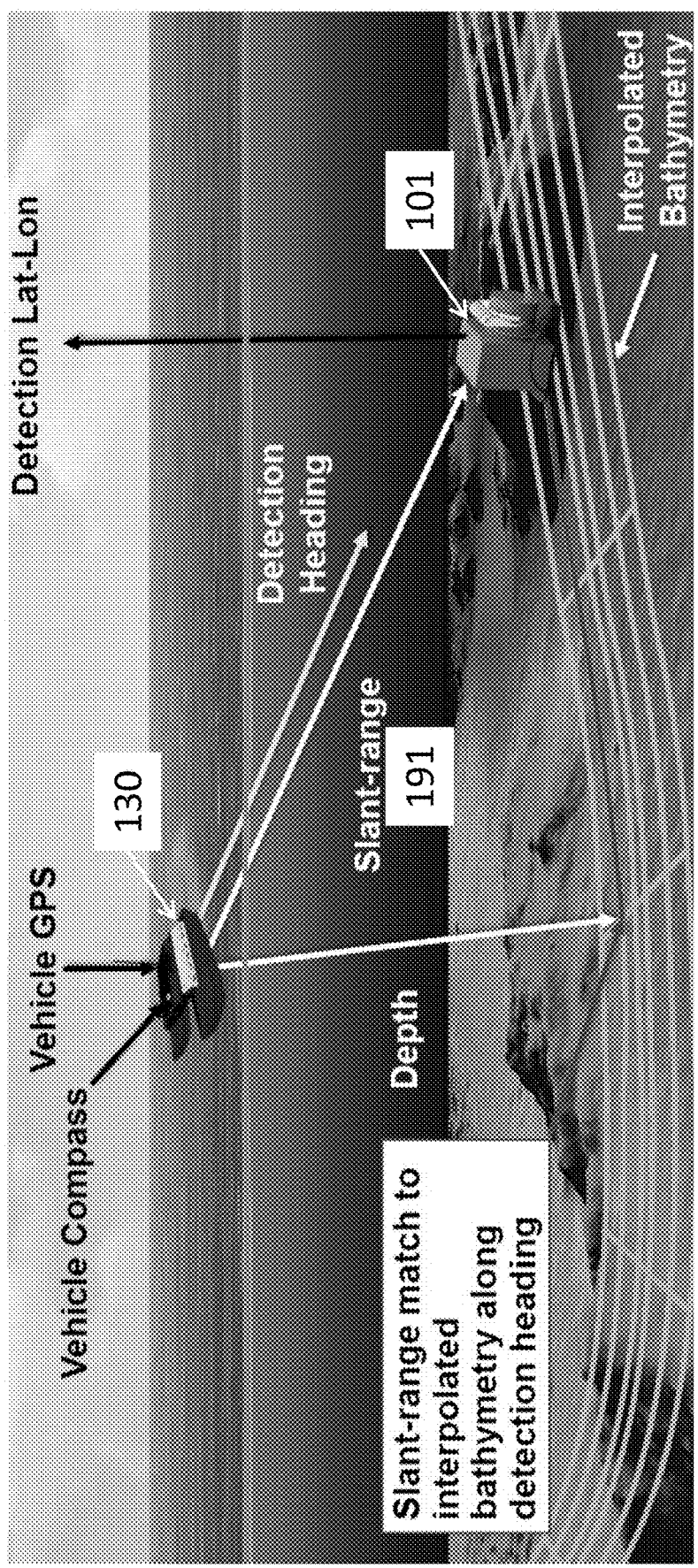
FIG. 6 illustrates a schematic for the process of determining geolocation data for an object of interest detected underwater in accordance with embodiments taught herein.

In accordance with various embodiments, systems and methods taught herein can employ bathymetry-aided geolocation strategies to determine a geographical location for an object of interest using echogram data. In some embodiments, the collection platform 130 can include a geolocation module 137. The geolocation module 137 can include one or more of a global positioning system (GPS), a compass, and other navigation instruments to determine speed, location, and heading of the collection platform 130. The geolocation module 137 can provide data from its instruments to the processor 152 of the computing device 150 via the communication link 142. In some embodiments, the computing device 150 can associate geolocation data obtained from the geolocation module 137 with the echogram. For example, an echogram that includes range vs. time information may have geolocation data associated with each acquisition period In some embodiments, the processor 152 of the computing device 150 can associate geolocation data for the collection platform 130 obtained from instrumentation with interpolated bathymetry calculated from echogram data to identify the position of the object of interest 101 in geocoordinates. As shown in FIG. 6, bathymetry is the measurement of underwater topography along the bottom of the body of water. Interpolated bathymetry data is data that has been transformed from two-dimensional echogram image data to vertical height information. In some embodiments, the processor 132, 152 of the collection platform 130 can determine bathymetry data along the track of the vehicle associated with the collection platform 130. The processor 132, 152 can then mesh (e.g. by Delaunay triangularization) and interpolate this data to provide a 3D bathymetric map of the scene that is captured in the echogram data. In some embodiments, the meshing and interpolation operations can provide the bathymetric map at a desired resolution depending upon application-specific constraints. In some embodiments, the computing device 150 can retrieve pre-existing bathymetry data for the applicable body of water from a database.

In some embodiments, the computing device 150 can determine geolocation information (e.g., geocoordinates) for the object of interest 101 by comparing the location of the object of interest 101 within the echogram to bathymetry data. In some embodiments, the geolocation module 137 of the collection platform 130 can provide the location and heading of the collection platform 130. Given the known location and heading, a pixel in a scan line of the echogram (i.e., the line of data corresponding to a constant time value) corresponds to a slant range 191 from the sonar sensor 135 which matches to just one point on the 3D interpolated bathymetry map of the scene. In other words, the geolocation of the object of interest can be estimated from the intersection of the slant range 191 as "line of sight" and the bottom of the water body. In some embodiments, the computing device 150 can project the point corresponding to the pixel in which an object of interest 101 is identified to the surface of the water to acquire geocoordinates for the object of interest 101. In some embodiments, the geocoordinates can include latitude and longitude for the object of interest 101.

The sound transmitter 132 or sonar sensor 135 can have a pointing direction and a cone of uncertainty around that pointing direction that inherently introduces a level of uncertainty as to the true location of a detected object underwater. In some embodiments, the collection platform 130 can acquire multiple observations of the same scene from different locations or at different pointing angles. By comparing the detected location of the object of interest using echogram data acquired from different pointing angles or different locations, the computing device 150 can estimate and weight the absolute geocoordinates for the detected object of interest based upon the uncertainty for each measurement.

By leveraging multiple echograms acquired at different times or at different locations or viewing angles with respect to the object of interest, classification and geolocation estimates for the object of interest can be improved or refined. For example, differences in seafloor topography can cause the object to be partially obscured from some viewing angles. Similarly, the object may appear different in different poses (e.g., the bow of a ship versus the side of the ship). In some embodiments, the computing device 150 can update the classification or estimated geocoordinates associated with the object of interest based upon additional echograms or observations.

Figures 7C, 7D, 7E:
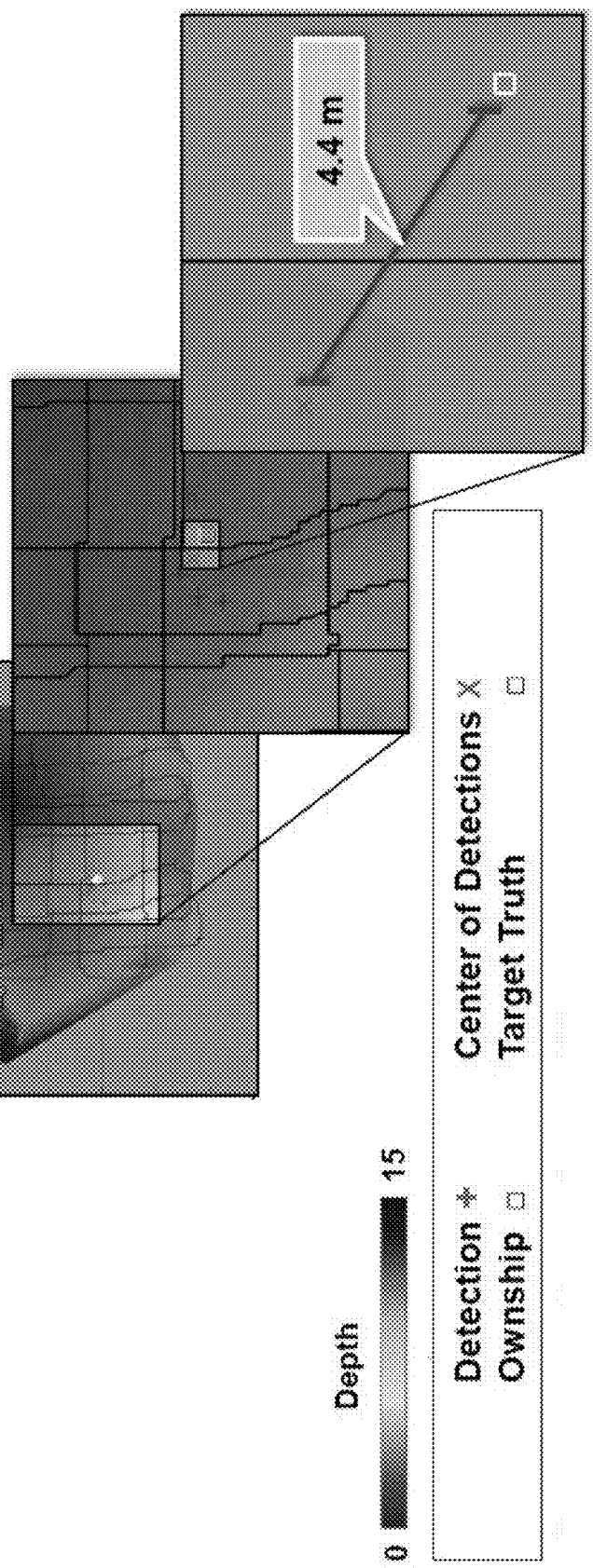

FIGS. 7A-7E illustrate a variety of views of detection trajectories and predicted latitude and longitude mapped in two- and three-dimensional space for a live detection and location validation test. FIG. 7A includes an isometric view of the underwater topography near the detected object of interest and FIG. 7B illustrates a magnified view of FIG. 7A. The detection trajectories are illustrated in the figures. FIGS. 7C-7E show magnified versions of a projection of the isometric view along the depth direction. The detection locations are depicted in FIG. 7C along with the center of detections and the ground truth location of the object of interest. In this test, the sonar system 100, 100' was able to detect an object of interest and provide a geolocation for the object of interest with an error of about 4.4 m.

Figure 8:
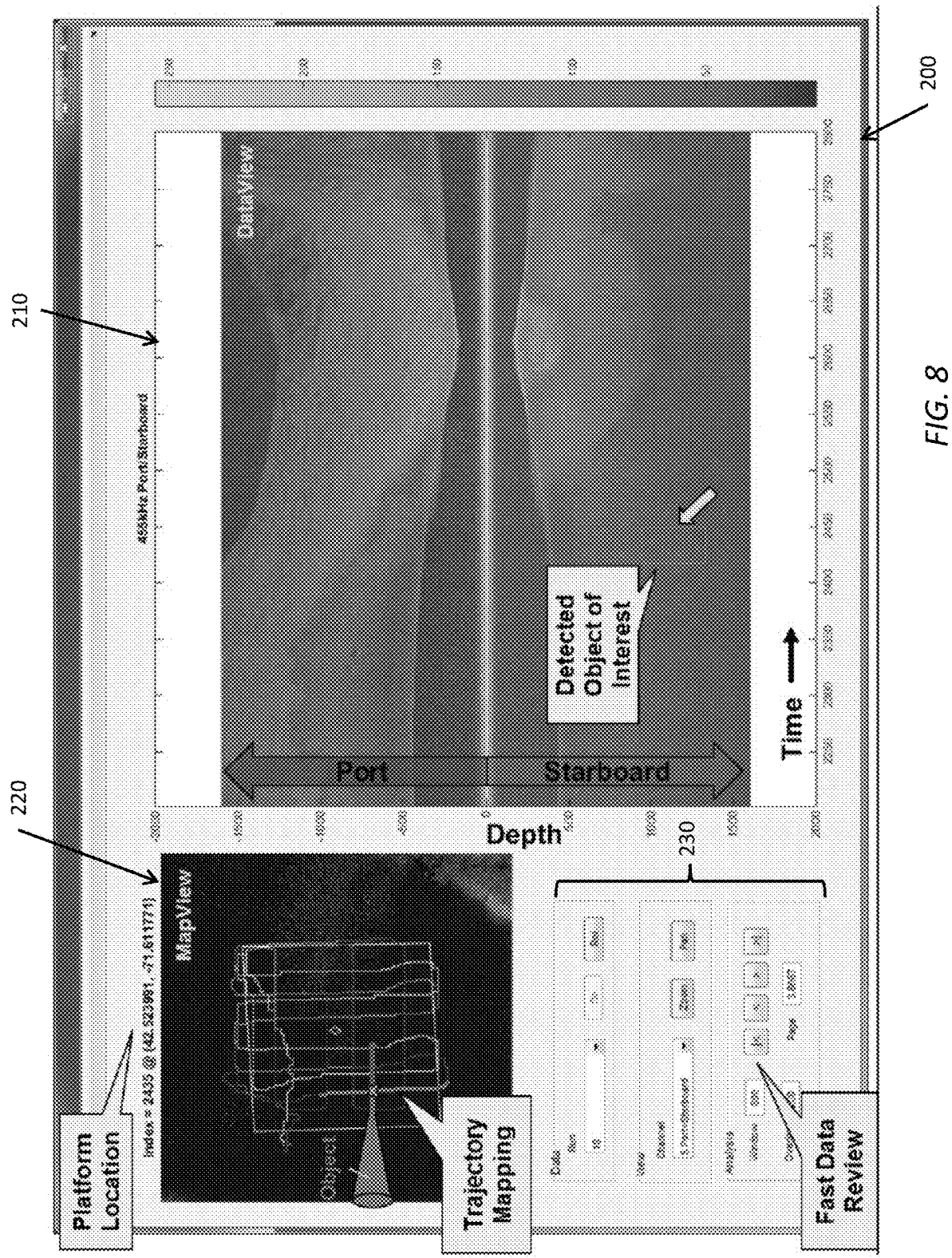
FIG. 8 depicts a graphical user interface in accordance with various embodiments taught herein.

In accordance with various embodiments, the sonar system 100, 100' may provide a user with a graphical user interface (GUI) 200 on a display 160 to allow the user to interact with and guide the system during object detection and classification. In some embodiments, the GUI 200 can include one or more subpanels including a data viewer 210 and a map viewer 220 as shown in FIG. 8. The GUI 200 can include one or more user interaction elements 230. In various embodiments, the user interaction elements 230 can be operated using a mouse, a keyboard, a touchscreen, or other suitable input device. In some embodiments, the user interaction elements 230 can be operated using a touchscreen interface. User interaction elements 230 can include data, view, and analysis elements. For example, a data element can allow the user to adjust the range of data for display, the view element can allow the user to pan, zoom, or change the sensor for which data is displayed, and the analysis element can allow the user to adjust windows and page through time-series data.

In some embodiments, the GUI 200 can simultaneously display geolocation information (e.g., latitude and longitude) of the collection platform 130 in the map viewer 220 and time-series echogram data in the data viewer 210. In some embodiments, the data viewer 210 can include highlights to visually flag objects (e.g., using a bounding box) detected or classified by the data model 154. In some embodiments, the user can select one or more of the highlighted regions in the data viewer 210 and receive information related to the time and location of the detection. For example, the corresponding geolocation of the collection platform 130 and the pointing direction of the sonar sensors 135 can be displayed on the map viewer 220 in the context of other geographical and topographical information. In some embodiments, the estimated geocoordinates of some or all of the highlighted regions can be presented in the map viewer 220. In some embodiments, the GUI 200 can update the displayed geocoordinates in response to an analysis of additional echograms including the object of interest. In some embodiments, the GUI 200 can display estimated geocoordinate information for the selected highlighted region. In some embodiments, the GUI 200 can display an uncertainty related to the estimated geocoordinates for the highlighted region. By providing the user with the ability to access simultaneous map views and data views, the user can make a more informed determination as to whether an object of interest has been detected. In some embodiments, the map viewer can include a cone of uncertainty related to the geolocation information. The cone of uncertainty can significantly reduce the search area needed to physically locate the object by a recovery vehicle.

Figure 9:
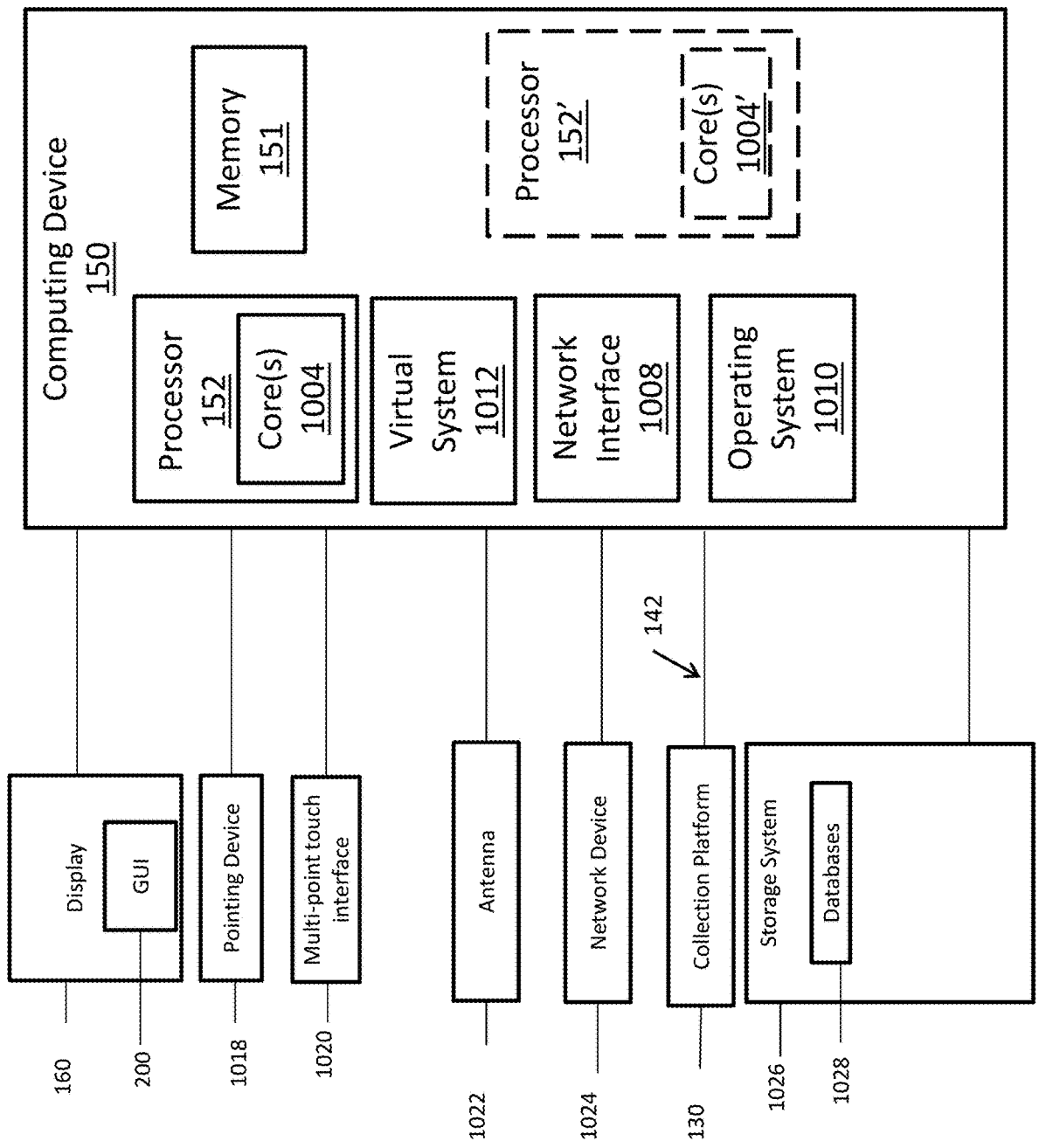
FIG. 9 illustrates a block diagram of an exemplary computing device for use with various embodiments taught herein.

FIG. 9 illustrates an exemplary computing device that may be utilized in an exemplary embodiment to perform the methods taught herein. The computing device 150 includes one or more non-transitory computer-readable media for storing one or more computer-executable instructions (such as but not limited to software or firmware) for implementing methods according to the principles taught herein. The non-transitory computer-readable media can include, but are not limited to, one or more types of hardware memory, non-transitory tangible media (for example, one or more magnetic storage disks, one or more optical disks, one or more USB flash drives), and the like.

For example, memory 151 included in the computing device 150 can store computer-readable and computer-executable instructions or software for implementing exemplary embodiments such as methods and modules described above in reference to FIGS. 1-8. For example, the memory 151 can store one or more of the screening module 159 and the data model 154 including feature extraction layers 156 and classification layers 158. Memory 151 can be non-transitory computer-readable media including a computer system memory or random access memory, such as DRAM, SRAM, EDO RAM, and the like. Memory 151 can include other types of memory as well, or combinations thereof.

The computing device 150 also includes processor 152 and associated core 1004, and optionally, one or more additional processor(s) 152' and associated core(s) 1004' (for example, in the case of computer systems having multiple processors/cores), for executing computer-readable and computer-executable instructions or software stored in the memory 151 and other programs for controlling system hardware such as the panning imaging device 102. Processor 152 and processor(s) 152' can each be a single core processor or multiple core (1004 and 1004') processor.

In some embodiments, the processor 152 can satisfy a range of SWaP constraints. For example, low-SWaP options can include ASIC, FPGA, GPU, and DSP processors. Modern CUDA-enabled GPUs, such us the Tegra K1 (TK1), consist of devices with one or more streaming multiprocessors (SMs) each containing multiple cores. GPUs work well for parallel applications with high-levels of fine-grain data parallelism. Computer Vision is an application in which there is little dependency between data elements or image pixels. This is often referred to as embarrassing parallelism, meaning that the task is easily broken into a number of smaller, independent, parallel sub-tasks. In some embodiments, the processor 152 can exploit thread-level parallelism (TLP) on multi-core CPUs or data-level parallelism (DLP) on the GPU. In some embodiments, DLP can be employed on CPUs by utilizing single instruction multiple data (SIMD) units. In another embodiment, a combination of GPUs and multi-core CPUs is used. In some embodiments, the processor 152 can include a hardware-accelerated video decoder. In some embodiments, the processor 152 can include a hardware-implemented deep neural network. In such an embodiment, the data model 154 can be formed at least partially from the hardware-implemented deep neural network.

Virtualization can be employed in the computing device 150 so that infrastructure and resources in the computing device can be shared dynamically. A virtual machine 1012 can be provided to handle a process running on multiple processors so that the process appears to be using only one computing resource rather than multiple computing resources. Multiple virtual machines can also be used with one processor.

A user can interact with the computing device 150 through a display 160, such as a touch screen display or computer monitor, which can display one or more user interfaces or graphical user interfaces (GUIs) 200 that can be provided in accordance with exemplary embodiments. The computing device 150 can also include other I/O devices for receiving input from a user, for example, a keyboard or any suitable multi-point touch interface 1020 or a pointing device 1018 (e.g., a pen, stylus, mouse, or trackpad). The multi-point touch interface 1020 and the pointing device 1018 can be coupled to the display 160. The computing device 150 can include other suitable conventional I/O peripherals.

The computing device 150 can also include one or more storage devices 1026, such as a hard-drive, CD-ROM, or other non-transitory computer readable media, for storing data and computer-readable instructions and/or software, such as the data model 154 and code for the execution thereof and/or data related thereto that can implement exemplary embodiments of the methods and systems as taught herein, or portions thereof. Exemplary storage device 1026 can also store one or more databases 1028 for storing any suitable information required to implement exemplary embodiments. The databases can be updated by a user or automatically at any suitable time to add, delete, or update one or more items in the databases. Exemplary storage device 1026 can store one or more databases 1028 for storing any other data/information used to implement exemplary embodiments of the systems and methods taught herein. In some embodiments, some or all of the modules shown in the memory 151 in FIG. 1 may be stored in databases 1028 of the storage system 1026.

In some embodiments, the computing device 150 can communicate with the collection platform 130 using the communication link 142. In various embodiments, the communication link 142 can be a wired or wireless connection. In some embodiments, the communication link 142 can be used to transfer data including echogram images and location or orientation data of the geolocation module 137 from the collection platform 130 to the computing device 150. In some embodiments, the communication link 142 can be used to transfer operating instructions from the computing device 150 to the collection platform 130 such as navigation information or control instructions to operate a motor on the collection platform.

The computing device 150 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1008 can include a built-in network adapter, network interface card, PCMCIA network card, card bus network adapter, wireless network adapter, USB network adapter, modem or any other device suitable for interfacing the computing device 150 to any type of network capable of communication and performing the operations taught herein. In some embodiments, the computing device 150 can communicate wirelessly with other computing systems, the collection platform 130, or networking environments using an antenna 1022. Moreover, the computing device 150 can be any computing device that is capable of communication and that has sufficient processor power and memory capacity to perform the operations taught herein.

The computing device 150 can run operating system 1010, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations taught herein. In exemplary embodiments, the operating system 1010 can be run in native mode or emulated mode. In an exemplary embodiment, the operating system 1010 can be run on one or more cloud machine instances.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Figure 10:
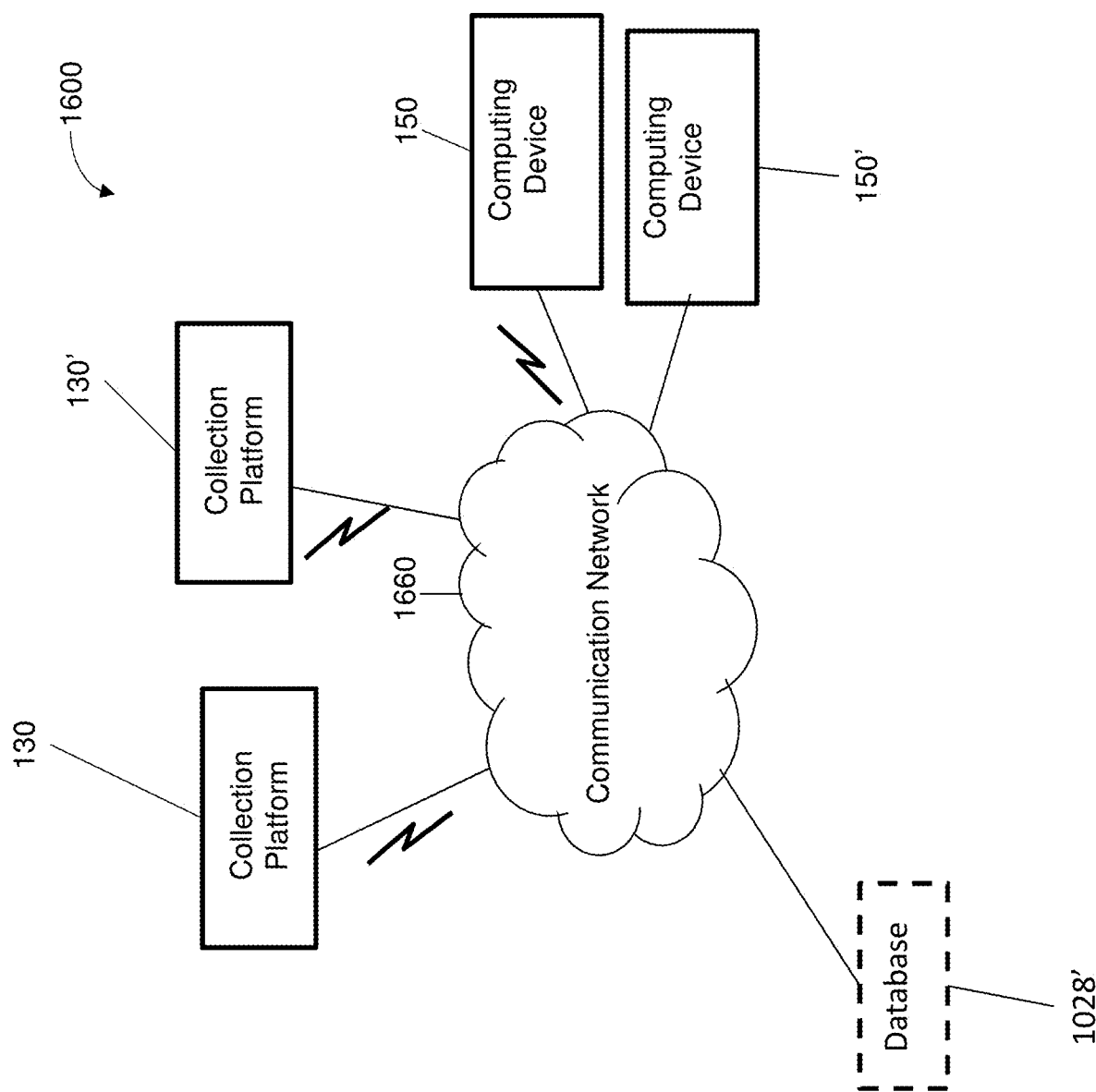
FIG. 10 illustrates a block diagram of an exemplary distributed network environment for use with various embodiments taught herein.

FIG. 10 illustrates a block diagram of an exemplary distributed network environment 1600 for use with systems and methods taught herein. The environment 1600 can include the computing device 150 configured to be in communication with the collection platform 130 via a communication network 1660, which can be any network over which information can be transmitted between devices communicatively coupled to the network. For example, the communication network 1660 can be the Internet, Intranet, virtual private network (VPN), wide area network (WAN), local area network (LAN), and the like. In some embodiments, the communication network 1660 can be part of a cloud environment. The environment 1600 can include one or more computing devices 150, 150' that can be in communication with one another or other devices on the communication network 1660. The environment 1600 can include one or more collection platforms 130, 130' that can be in communication with one another or other devices on the communication network 1660. For example, the environment 1600 can include multiple collection platforms 130, 130' that work simultaneously to acquire data from a common region or area of the body of water while searching for an object of interest. In some embodiments, data from each collection platform can be pooled to create a superset of data for analysis by one or more computing devices 150, 150'. In some embodiments, image data from each collection platform 130, 130' can be transformed to have a common view angle or aspect ratio to more readily combine multiple data sources into a single set of data. The environment 1600 can optionally include at least one repository or data source 1028', which can be in communication with the computing devices 150, 150' via the communication network 1660.

Those skilled in the art will recognize that the data source(s) 1028' can be incorporated into the computing device 150, 150' such that the computing device 150, 150' can include one or more of the data sources 1028'. In some embodiments, the data sources 1028' can include databases of detected objects and associated attribute information such as heading, geolocation, or speed of the collection platform 130, 130', or estimated classification for the detected object. In some embodiments, the data sources 1028' can include various data models or databases described above including neurons or filters, feature extraction layers 156, or classification layers 158, or computer-executable instructions or automated scripts that describe techniques for detection and classification of objects of interest in an underwater environment.

Figure 11:
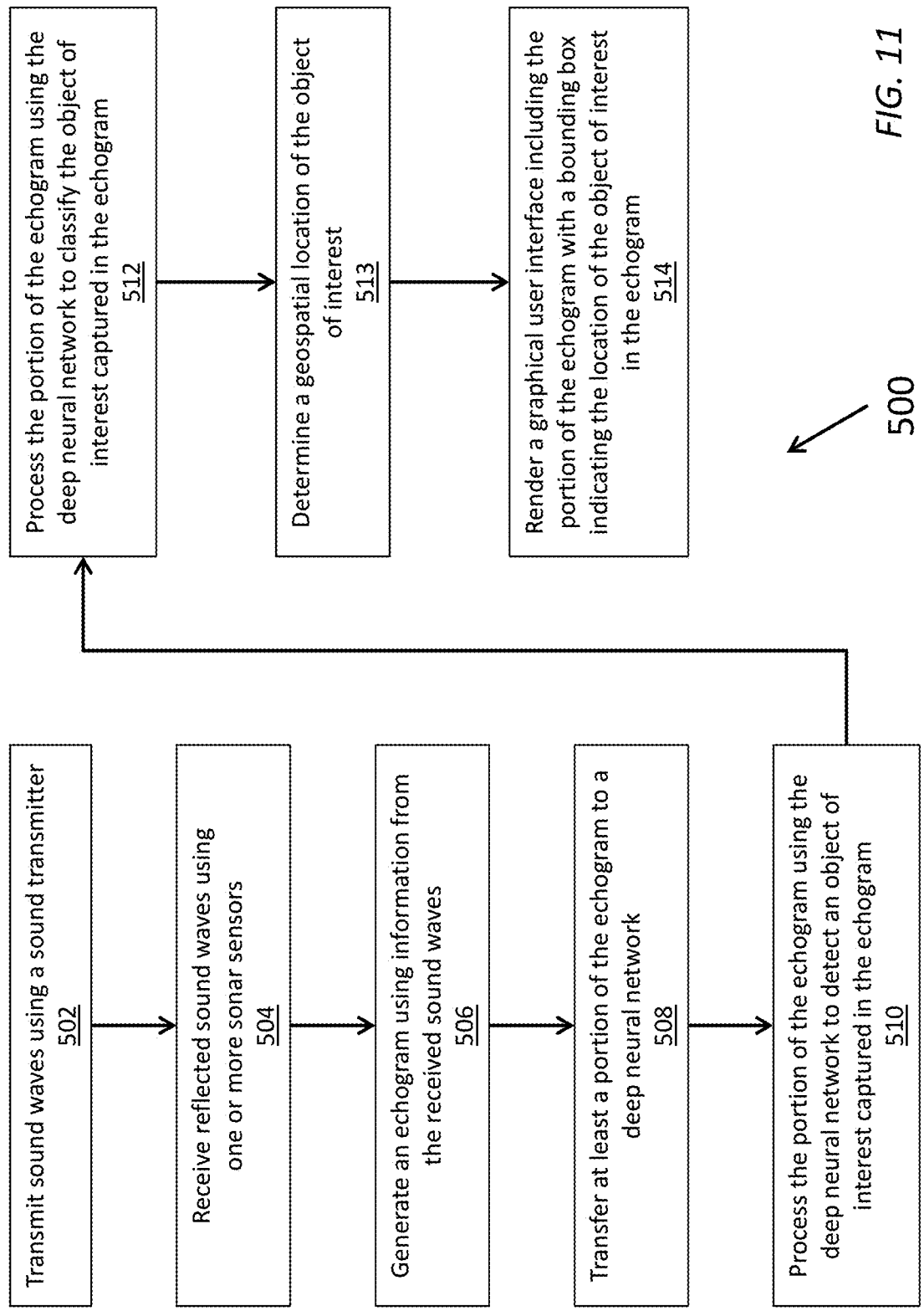
FIG. 11 illustrates a flowchart for a method of detecting an object of interest in an underwater environment according to various embodiments described herein.

FIG. 11 illustrates a flowchart for a method 500 of detecting an object of interest underwater in accordance with various embodiments taught herein. The method includes transmitting sound waves using a sound transmitter (step 502). For example, the sound transmitter 132 of the collection platform 130 can be used to direct sound waves underwater to image a scene. The method includes receiving the reflected sound waves using one or more sonar sensors (step 504). For example, the one or more sound sensors 135, 135' of the collection platform 130 can be used to receive sound waves reflected from objects and terrain underwater in the scene. In some embodiments, the emission and detection of sound waves can be performed by the system without human intervention. The method includes generating an echogram using information from the received sound waves (step 506). For example, the echogram can correspond to the intensity of the received sound waves and time-of-flight to create a map of reflected sound intensity as a function of depth or range.

The method includes transferring at least a portion of the echogram to a deep neural network (step 508). For example, the echogram can be used as in input into a data model 154 including a deep neural network with feature extraction layers 156 and classification layers 158 that is held in the memory 151 of the computing device 150 as described above. The method includes processing the portion of the echogram using the deep neural network to detect an object of interest captured in the echogram (step 510). For example, the data model 154 including the deep neural network can process the echogram image to discriminate between objects of interest and background information. The method includes processing the portion of the echogram using the deep neural network to classify the object of interest captured in the echogram (step 512). For example, the data model 154 including the deep neural network can process the image to provide confidence scores indicating how well the detected object of interest matches known classifications. In some embodiments, steps 510 and 512 can be combined into a single processing step to both detect and classify the object of interest in a single operation. In some embodiments, the deep neural network can perform detection and classification of objects in the echogram automatedly, i.e., without human intervention. The method includes determining a geospatial location of the object of interest (step 513). For example, the computer system 150 can compare interpolated three-dimensional bathymetry data with the slant range 191 to the object of interest derived from the echogram and project this location to the surface of the water to determine latitude and longitude for the object of interest. In some embodiments, the systems can determine the geospatial locations of objects of interest automatedly, i.e., without human intervention. The method includes rendering a graphical user interface including the portion of the echogram with a bounding box indicating the location of the object of interest in the echogram (step 514). For example, the graphical user interface 200 can be rendered on a display 160.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art recognizes that exemplary methods may include more or fewer steps than those illustrated in the exemplary flowcharts, and that the steps in the exemplary flowcharts may be performed in a different order than the order shown in the illustrative flowcharts.

The invention claimed is:

1. In a sonar system, a method of detecting and classifying an object of interest underwater, comprising:
   acquiring an echogram of a scene, the echogram formed using sound wave imaging;
   transferring a portion of the echogram to a deep neural network including one or more feature extraction layers and one or more classification layers; and
   processing, using the deep neural network, the portion of the echogram to detect an object of interest captured in the echogram.

2. The method of claim 1, further comprising:
   processing, using the deep neural network, the portion of the echogram to classify the object of interest captured in the echogram.

3. The method of claim 1, wherein the one or more feature extraction layers and one or more classification layers are initially trained using non-echogram image data and the one or more classification layers are re-trained using echogram image data.

4. The method of claim 3, wherein the non-echogram image data includes electro-optical images.

5. The method of claim 1, further comprising:
   applying a screening module to identify candidate regions of interest in the echogram,
   wherein processing the echogram includes processing only the candidate regions of interest.

6. The method of claim 5, wherein the screening module performs a selective search.

7. The method of claim 5, wherein the screening module performs a search using signal-to-noise ratio as a detection metric.

8. The method of claim 1, wherein processing the portion of the echogram includes:
   associating geolocation data with the portion of the echogram; and
   determining a geospatial location of the detected object in the portion of the echogram.

9. The method of claim 8, wherein the geolocation data is obtained from a geolocation module of a collection platform.

10. The method of claim 1, further comprising:
    acquiring a second echogram; and
    processing, using the deep neural network, a portion of the second echogram to detect the object in the portion of the second echogram.

11. The method of claim 10, wherein the second echogram includes a different pose or view angle of the object than the pose or view angle of the object in the first echogram.

12. The method of claim 10, wherein the second echogram is acquired at a different frequency than the first echogram.

13. The method of claim 1, wherein the echogram is acquired using an active sonar system.

14. The method of claim 1, wherein the computational neural network includes at least one of a ResNet, AlexNet, VGGNet, or GoogLeNet architecture or an architecture based on Google Inception.

15. The method of claim 1, wherein processing the portion of the echogram occurs in real-time.

16. The method of claim 1, further comprising:
    displaying, on a display, a graphical user interface including the echogram overlaid with a bounding box indicating the detected object.

17. The method of claim 16, further comprising:
    in response to selection of the bounding box by a user, displaying, on the graphical user interface, a map viewer including a map overlaid with information representing the location of a collection platform that acquired the echogram, a pointing direction of sensors on the collection platform at the time of acquisition, and an estimated geolocation for the object of interest.

18. The method of claim 1, wherein the object of interest is man-made.

19. The method of claim 18, wherein the object of interest is a hollow object having a distinctive echogram image signature.

20. A system for detecting and classifying an object underwater, comprising:
    a computing device including a processor and a memory operatively coupled to the processor, the memory having stored therein instructions that when executed by the processor cause the processor to:
    acquire an echogram of a scene, the echogram formed using sound wave imaging;
    transfer a portion of the echogram to a deep neural network including one or more feature extraction layers and one or more classification layers; and
    process, using the deep neural network, the portion of the echogram to detect an object of interest captured in the echogram.

21. The system of claim 20, wherein the instructions executed by the processor cause the processor to:
    process, using the deep neural network, the portion of the echogram to classify the object of interest captured in the echogram.

22. The system of claim 20, wherein the one or more feature extraction layers and one or more classification layers are initially trained using non-echogram image data and the one or more classification layers are re-trained using echogram image data.

23. The system of claim 22, wherein the non-echogram image data includes electro-optical images.

24. The system of claim 20, further comprising a collection platform including one or more sonar sensors to acquire the echogram.

25. The system of claim 24, wherein the collection platform further comprises a sound transmitter to emit sonar signals that interact with the object and are detected by the one or more sonar sensors.

26. The system of claim 20, wherein the instructions further cause the processor to:

apply a screening module of the data model to identify candidate regions of interest in the echogram, and
wherein processing the echogram includes processing only the candidate regions of interest.

27. The system of claim 26, wherein the screening module performs a selective search.

28. The system of claim 26, wherein the screening module performs a search using signal-to-noise ratio as a detection metric.

29. The system of claim 20, wherein the instructions to process the portion of the echogram further cause the processor to:
associate geolocation data with the portion of the echogram; and
determine a geospatial location of the detected object in the portion of the echogram.

30. The system of claim 29, wherein the geolocation data is obtained from a geolocation module of a collection platform.

31. The system of claim 20, wherein the instructions further cause the processor to:
acquire a second echogram; and
process, using the deep neural network, a portion of the second echogram to detect the object in the portion of the second echogram.

32. The system of claim 31, wherein the second echogram includes a different pose or view angle of the object than the pose or view angle of the object in the first echogram.

33. The system of claim 31, wherein the second echogram is acquired at a different frequency than the first echogram.

34. The system of claim 20, wherein the computational neural network includes at least one of a ResNet, AlexNet, VGGNet, or GoogLeNet architecture or an architecture based on Google Inception.

35. The system of claim 20, wherein the processor is configured to process the portion of the echogram in real-time.

36. The system of claim 20, further comprising a display to display a graphical user interface including the echogram overlaid with a bounding box indicating the detected object.

37. The system of claim 36, wherein the graphical user interface includes a map viewer including a map overlaid with information representing the location of a collection platform that acquired the echogram, a pointing direction of sensors on the collection platform at the time of acquisition, and an estimated geolocation for the object of interest.

38. The system of claim 20, wherein the object of interest is man-made.

39. The system of claim 38, wherein the object of interest is a hollow object having a distinctive echogram image signature.

40. A non-transitory machine readable medium storing instructions executable by a processor, wherein execution of the instructions causes the processor to carry out a method for detecting and classifying an object of interest underwater, the method comprising:
acquiring an echogram of a scene, the echogram formed using sound wave imaging;
transferring a portion of the echogram to a deep neural network including one or more feature extraction layers and one or more classification layers; and
processing, using the deep neural network, the portion of the echogram to detect an object of interest captured in the echogram.

* * * * *